US009246885B2

(12) United States Patent
Castro et al.

(10) Patent No.: US 9,246,885 B2
(45) Date of Patent: *Jan. 26, 2016

(54) SYSTEM, METHOD, APPARATUS AND COMPUTER PROGRAMS FOR SECURELY USING PUBLIC SERVICES FOR PRIVATE OR ENTERPRISE PURPOSES

(71) Applicant: International Business Machines Corporation, Armonk, NY (US)

(72) Inventors: Paul C Castro, Sharon, MA (US); Marco Pistoia, Amawalk, NY (US); John J. Ponzo, Yorktown Heights, NY (US); Gregory L. Truty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 154 days.

This patent is subject to a terminal disclaimer.

(21) Appl. No.: 13/855,252

(22) Filed: Apr. 2, 2013

(65) Prior Publication Data

US 2014/0298476 A1 Oct. 2, 2014

(51) Int. Cl.
*G06F 17/30* (2006.01)
*G06F 7/04* (2006.01)
*H04N 7/16* (2011.01)
*H04L 29/06* (2006.01)
*G06F 21/60* (2013.01)
*G06F 21/62* (2013.01)
*G06F 11/30* (2006.01)
*G06F 15/173* (2006.01)

(52) U.S. Cl.
CPC .......... *H04L 63/0428* (2013.01); *G06F 21/606* (2013.01); *G06F 21/6245* (2013.01)

(58) Field of Classification Search
USPC .......... 713/168–174, 182–186, 202; 709/206, 709/225, 229, 249, 389; 726/2–8, 26–32
See application file for complete search history.

(56) References Cited

U.S. PATENT DOCUMENTS

| | | |
|---|---|---|
| 2007/0139231 A1 | 6/2007 | Wallia et al. |
| 2009/0113200 A1* | 4/2009 | Van Wie et al. ............... 713/150 |
| 2010/0027552 A1 | 2/2010 | Hill |
| 2011/0047117 A1 | 2/2011 | Sinha |
| 2011/0072486 A1 | 3/2011 | Hadar et al. |

(Continued)

OTHER PUBLICATIONS

Casado et al., "SANE: A Protection Architecture for Enterprise Networks," Proceedings of the 15th USENIX Security Symposium, pp. 137-151, Jul. 31-Aug. 4, 2006, http://131.106.3.253/events/sec06/tech/full_papers/casado/casado.pdf.
Jiague et al., "Functionalities of the Policy Enforcement Manager," Livrable numéro 4.1, Feb. 2010.
Wu, Yongdong et al., "A Gateway-based Access Control Scheme for Collaborative Clouds," ICIMP 2012: The Seventh International Conference on Internet Monitoring and Protection, pp. 54-60, 2012.

*Primary Examiner* — Evans Desrosiers
(74) *Attorney, Agent, or Firm* — Harrington & Smith (57) ABSTRACT

A method, system, apparatus and computer programs are disclosed to process content for an enterprise. The method includes reviewing, using at least one enterprise policy, content that is to be sent through a data communications network to a public service to determine if the content comprises secure data and, in response to identifying secure data, modifying the content to be sent to the public service such that a presence of secure data will be visually imperceptible when the content is rendered at the public service. The step of modifying can include steganographically embedding the secure data or a link to the secure data in a container such as image data.

15 Claims, 7 Drawing Sheets

(56) References Cited

U.S. PATENT DOCUMENTS

| | | |
|---|---|---|
| 2011/0167255 A1 | 7/2011 | Matzkel et al. |
| 2011/0209196 A1* | 8/2011 | Kennedy ............................ 726/1 |
| 2012/0278504 A1 | 11/2012 | Ang et al. |
| 2014/0169616 A1* | 6/2014 | Homme et al. ................ 382/100 |

\* cited by examiner

9A: Reviewing, using at least one enterprise policy, content that is to be sent through a data communications network to a public service to determine if the content comprises secure data 9B: In response to identifying secure data, modifying the content to be sent to the public service such that a presence of secure data will be visually imperceptible when the content is rendered at the public service

FIG. 9

SYSTEM, METHOD, APPARATUS AND COMPUTER PROGRAMS FOR SECURELY USING PUBLIC SERVICES FOR PRIVATE OR ENTERPRISE PURPOSES

TECHNICAL FIELD

The exemplary embodiments of this invention relate generally to public and private communication networks, enterprise networks, consumer networks, social media sites, cloud-based services, and to techniques for obscuring content sent over a communications network such as by the use of steganographic, encryption and token-based techniques.

BACKGROUND

Businesses and in general enterprises are increasingly outsourcing some or all of their information technology (IT) to vendors and relying more on products that originate outside of the enterprise. The evolution of IT into the consumer domain is developing a trend where enterprises would desire to exploit existing consumer services for enterprise purposes while maintaining the high-degree of management and security that is a hallmark of most enterprise software. As one non-limiting example an enterprise may wish to store all of the enterprise business content on commodity online storage vendors rather than host their own content servers, but still be capable of managing and tracking the data as if it were stored on in-house storage devices. Relying on a vendor to reliably perform such tasks to a satisfactory degree assumes a certain amount of risk and requires a considerable amount of communication between the different parties to ensure that a proper level of service is established and maintained.

SUMMARY

In one aspect thereof this invention provides a method to process content for an enterprise. The method comprises reviewing, using at least one enterprise policy, content that is to be sent through a data communications network to a public service to determine if the content comprises secure data and, in response to identifying secure data, modifying the content to be sent to the public service such that a presence of secure data will be visually imperceptible when the content is rendered at the public service.

In a further aspect this invention provides a system to process content for an enterprise. The system comprises at least one data processor; at least one computer readable medium that stores software program instructions that are executable by the at least one data processor; and at least one interface to a data communications network. In the system execution of the software program instructions results in performance of operations that comprise reviewing, using at least one enterprise policy, content that is to be sent through a data communications network to a public service to determine if the content comprises secure data and, in response to identifying secure data, modifying the content to be sent to the public service via said at least one interface such that a presence of secure data will be visually imperceptible when the content is rendered at the public service.

DETAILED DESCRIPTION

The use of the various exemplary embodiments of this invention enable the creation of at least one virtual private enterprise (VPE), where publically available consumer services can be used by an enterprise but with higher levels of management and security than typically required in the consumer space. Using the embodiments of the invention enables the interaction to the consumer service to be viewed as a virtual partition, where enterprise-related activities can be managed apart from personal activities. This management can include usage tracking, integration to enterprise-related systems and security.

The embodiments of this invention can be at least partially embodied as a software middleware that is able to proxy requests between the enterprise and vendor services. One purpose of the software middleware proxy is to increase the transparency of operation of the vendor services and provide some level of protection for a case where data confidentiality needs to be preserved. In one example of this service the enterprise can rely on one or more third party storage providers that may or may not be trusted with business data. An aspect of this invention in this non-limiting example is to provide client and server-based tools to transparently intercept communications between the enterprise and the third party storage provider. Depending on a policy or policies that are in place the invention can secure the data through encryption or by the use of some other technique.

Another example of virtualization is tracking the usage of consumer services. For example, employees of the enterprise may use a social media site. The invention can intercept requests that originate in the enterprise for this social media site and modify the requests to reflect the fact that the related interaction is enterprise-related. For example, an employee that posts to some social media site can have hashtags applied to the employee's work-related posts to make it easier for other employees to find the work-related posts. In such a case the posts could relate to, for example, scheduling a meeting, or for the collaborative review of a document-in-progress, or for any enterprise work-related activity. Confidential information could be encrypted before being posted and this data could be unencrypted and read by the employees of the enterprise but not by public users of the social media site.

Service level agreements (SLAs) may also exploit this invention by allowing a closer monitoring of third party services without intervention from third party IT managers. This provides an enhanced degree of transparency by enabling the customer to ensure that the third party is providing the proper level of service. This can be extended to allow the customer to configure some aspects of the service. As an example, the enterprise may request that data related to a prior employee or a terminated project be archived and stored in less expensive storage.

The examples of the embodiments of this invention are particularly useful when an enterprise, such as a for-profit organization, a not-for-profit organization, or a governmental agency, may have a need to extend the reach of their enterprise networks into consumer services running on the Internet. Public services such as public networks and social media sites reachable through public networks are typically untrusted, which would prevent the use of these services for enterprise purposes. The embodiments of this invention address this and other issues by allowing secure content to be sent to public services with some privacy protection guarantees. The embodiments of this invention go beyond the use of simple encryption, and can instead employ a tokenization method that allows secure enterprise content to be seamlessly integrated with the public service even for those users not authorized to see the secure enterprise content. For example the secure enterprise content can be present but seamlessly integrated into the public service in a format that obscures the actual secure content from unauthorized viewers. The embodiments of this invention can exploit the multiple channels that enterprise users may employ for collaboration by partitioning data across channels to further increase security.

The Internet has evolved into a platform for building large scale services that reach many people. Developers can easily and inexpensively build and deploy applications that can scale up to many millions of users while leaving the management of the infrastructure to third party vendors. Fully deployed services such as online stores and social media sites are growing to support more than a billion users and are easily used by non-technical users. Some third party vendors play dual roles: they are both a large e-commerce site as well as an application platform provider that exploits their expertise in building large scale systems.

Many enterprises now find it attractive to exploit this inexpensive computing infrastructure that is readily available. Rather than assuming the cost, and risk, of establishing and operating an in-house computing environment, enterprises now out-source at least some of their IT some of their needs to such third party vendors who can potentially offer reduced costs due at least to their ability to take advantage of economies of scale. For example, branded versions of some provided email are increasingly popular for universities and enterprises who wish not to operate their own in-house email infrastructure.

However, there are impediments to the wider application and adaption of this growing trend of outsourcing IT. One serious impediment to those enterprises who wish to move some or all of their operations to the so-called "cloud" are issues regarding security and trust. Third party service vendors are not necessarily trusted to handle confidential information. Furthermore some third party vendors may propose terms of service that explicitly assume ownership of any data that a user uploads to the service.

There are on-going efforts in both the research and industrial domains to develop techniques for allowing data to be stored on untrusted providers. Some of the techniques are not widely applied in practice because they introduce increased requirements for storage and access. More practical attempts to obfuscate data focus mostly on encryption. For example, there have been several proposals to encrypt user generated content posted to social media sites where only those users having an appropriate encryption key can read the content. In this case the data would appear as just garbled text even to the service providers.

The embodiments of this invention provide improved techniques to utilize untrusted service providers for enterprise usage whereby the enterprise IT infrastructure is extended to cloud-based services that may not be under direct management of the enterprise. The embodiments of this invention allow the formation of a virtual private enterprise (VPE) network where enterprise IT functions can be seamlessly integrated with public services. Unlike previous proposals that require administrative access to underlying service provider platforms, such as virtual machine instances, the embodiments of this invention address the use of those consumer/public services that only make high-level user interfaces available such as social media sites.

Figure 1:
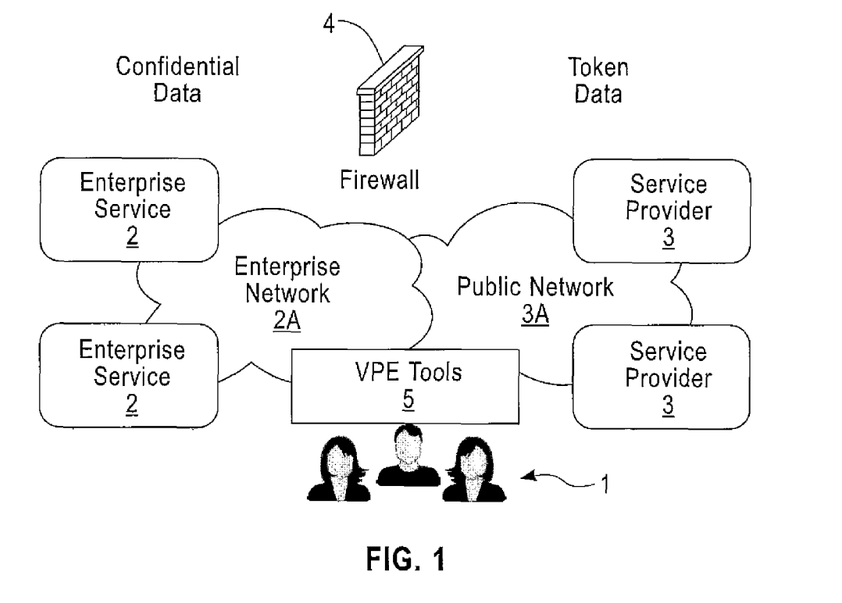
FIG. 1 shows an overview of one suitable and exemplary virtual private enterprise (VPE) model wherein enterprise users access both enterprise services and public services via their respective networks.

FIG. 1 shows an overview of one suitable and exemplary VPE model wherein enterprise users 1 access both enterprise services 2 and public services 3 via their respective networks 2A and 3A. Although a firewall 4 will typically separate the two, data is allowed to pass from the enterprise services 2 to the public services 3 freely, albeit in a transformed state so that the data is protected when it is outside the enterprise network 2A. Enterprise users 1 can retrieve the data from the public service 3 and read/modify the data using VPE tools 5 provided as part of a VPE infrastructure.

An aspect of this invention is an ability to preserve the user experience. As opposed to the simple use of encryption of data the use of the embodiments of this invention allows the enterprise content to be seamlessly integrated into the consumer public service. For example, a token-based scheme can be used to redirect users to enterprise content from the public service 3. Further by example the embodiments of this invention can store enterprise content on the public service and use a steganographic technique so that the public representation of the content is camouflaged and obscured for non-enterprise users.

The embodiments of this invention can also take advantage of social networks present in many social media sites to improve security. In one embodiment enterprise content can be sent to a group of people using secret sharing whereby decrypting the content is only possible if some certain number of persons of the group, but perhaps less than all persons, is connected in the social graph.

Figure 2:
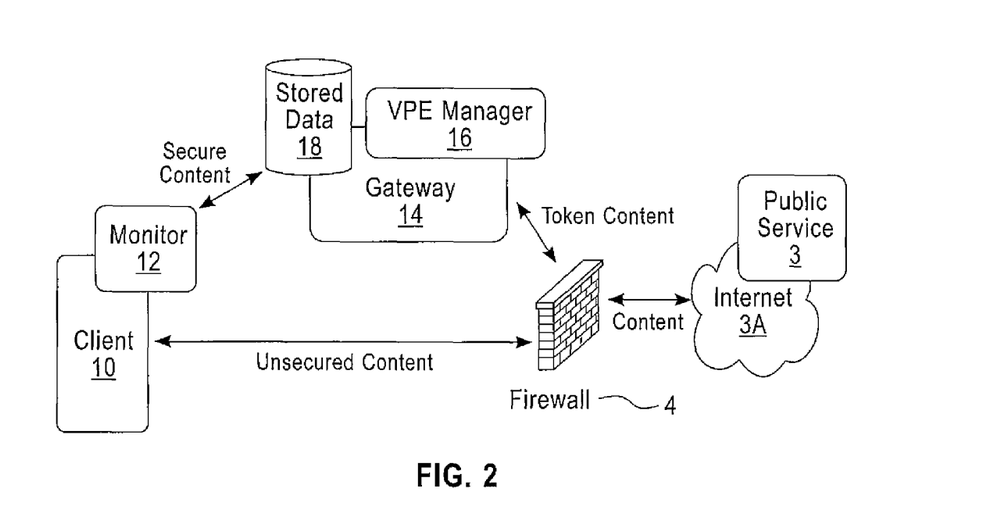
FIG. 2 depicts an overview of one non-limiting example of how client access to the network can be managed by the VPE system.

Client access to the network is managed by a VPE system. FIG. 2 depicts an overview of one non-limiting example of how such a system can be implemented. In FIG. 2 a client 10 connects to the network to send and receive content. Some of the content is secure and should only be viewable by other clients in the VPE network. Other content is unsecured (i.e., public). The client 10 is equipped with a VPE monitor 12 that functions as a policy enforcement point (PEP) or policy enforcement node (PEN). The VPE monitor 12 is responsible for evaluating the content the client 10 wishes to send over the network and for determining if the content should be forwarded to a VPE gateway 14.

The VPE gateway 14 determines in accordance with one or more policies one or more correct actions to take with respect to the content before it is allowed to proceed. Note that this operation is in some ways analogous to a Virtual Private Network (VPN), which allows clients to tunnel into an enterprise network when they are located outside that network's firewall. However, unlike VPN the VPE does not merely manage connections, but rather manages higher-level interactions between the client 10 and public services 3 outside of the enterprise network (beyond the enterprise firewall 4).

The monitor 12 installed at the client 10 can take a number of possible forms. For example, in a manner similar to a VPN client the monitor 12 could be installed at the operating system (OS) level of the client 10 and can thus have an ability to monitor all activities on the client machine (e.g., a client workstation, or personal computer, or portable computer, or tablet, or smartphone, etc.). As another non-limiting example the monitor 12 can be embedded in a single application and may thus only monitor usage of that particular application. As another non-limiting example the VPE monitor 12 can be implemented as a browser plugin that the user installs prior to accessing public services. If the user accesses, for example, a social media site the browser plugin can intercept a page load and replace some or all input fields with a new input field that enables the user to enter secure and un-secure data, e.g., a single text field can be split into two text fields, one for secure data and one for non-secure data. Alternatively a checkbox can be added next to some or all text fields that the user can check to indicate that the content entered into an associated text field represents secure content.

Once the monitor 12 determines based on at least one enterprise policy that the content is secure content it forwards the content to the VPE gateway 14. Residing at or otherwise in communication with the gateway 14 is a VPE manager 16. The VPE manager 16 is responsible for applying the correct transformations on the secure content before it is sent to the public service 3 (e.g., to the social media site). The transformations are dependent on enterprise policy and can be established by some appropriate enterprise authority such as the chief information officer (CIO). As an example of a policy, the CIO could specify that all documents uploaded to some consumer service file sharing storage/system must apply AES 128 encryption and be no larger than 200 MB. Another example of a policy would be that all text postings to a social media site that will carry confidential enterprise information should be tokenized (described below) and wrapped in some image, such as an image that shows the enterprise logo. Steganographic techniques, sometimes also referred to as "watermarking" or as "digital watermarking", can be used to embed the confidential enterprise information into the image so that it is not visually perceptible to the average person viewing the image.

Once the VPE manager 16 applies the correct transformation it may store the secure data locally on the gateway 14 in some data repository (memory) 18 and then send tokens representing the data to the public service 3. Note that this is not strictly necessary as the token content may itself contain the secure content encrypted in some manner to make it impossible for unauthorized users to view the content. However, to provide a more seamless integration with the public service 3 it may be embedded in a manner that camouflages the encrypted content, or alternatively it may be encrypted in such a way as to preserve some of the features of the unencrypted data such as, for example, sort ordering. For example, if the encrypted content is a list of people's names then it may still be possible to sort and order the encrypted names alphabetically.

When the client 10 access the public service 3 the monitor 12 is responsible for contacting the VPE manager 16 on the gateway 14 to reverse the tokenization of any secure content. The VPE manager 14 is able to detect the tokenized content and reverse the aforementioned process to make the secure content viewable at the client 10.

Figure 3:
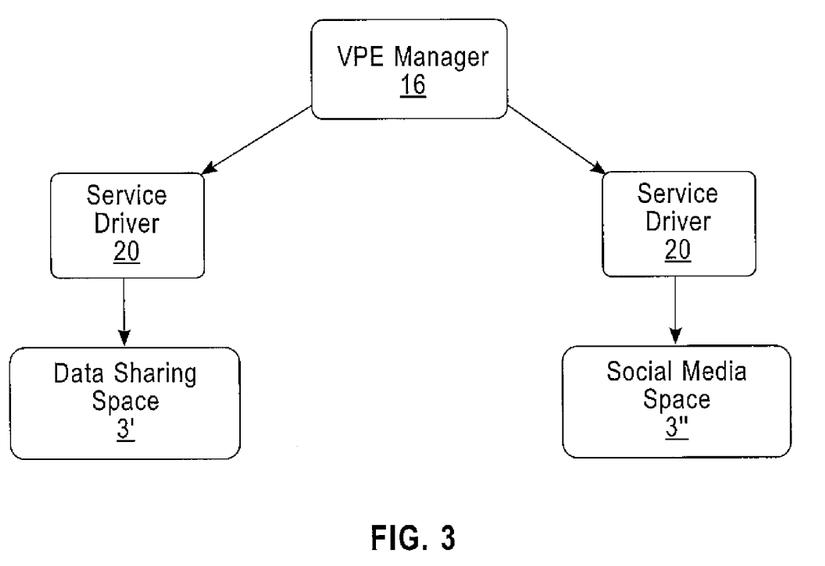
FIG. 3 provides an overview of a VPE manager shown in FIG. 2 in operation with two exemplary public services.

FIG. 3 provides an overview of the VPE manager 16 in operation with two exemplary public services 3, such as a data or document sharing space or service 3' and a social media space or service or site 3". In FIG. 3 the VPE manager 16 is connected to service drivers 20 which implement the necessary protocols to access an associated one of the public services 3. The service drivers 20 also enable the addition of enterprise control features on the public service 3 to ensure that secure content is delivered in a protected way.

As shown each of the two exemplary public services 3' and 3" has its own service driver 20. As an example, the service driver 20 for the document sharing service 3' can be used to upload, download, and delete files on the document sharing service 3'. The service driver 20 can also implement one or more encryption methods that can be applied to secure content before it is uploaded to the public service. The service driver 20 for the social media space 3" differs from the service driver 20 for the document sharing service 3' as it can use public protocols for interacting with the social media service to post status messages, upload and view photos, join groups, manage social networks, etc. In addition, the service driver 20 implements the necessary features to enable users to identify which content is secure, and can also implement a tokenization scheme needed to post secure content to the social media site.

Figure 4:
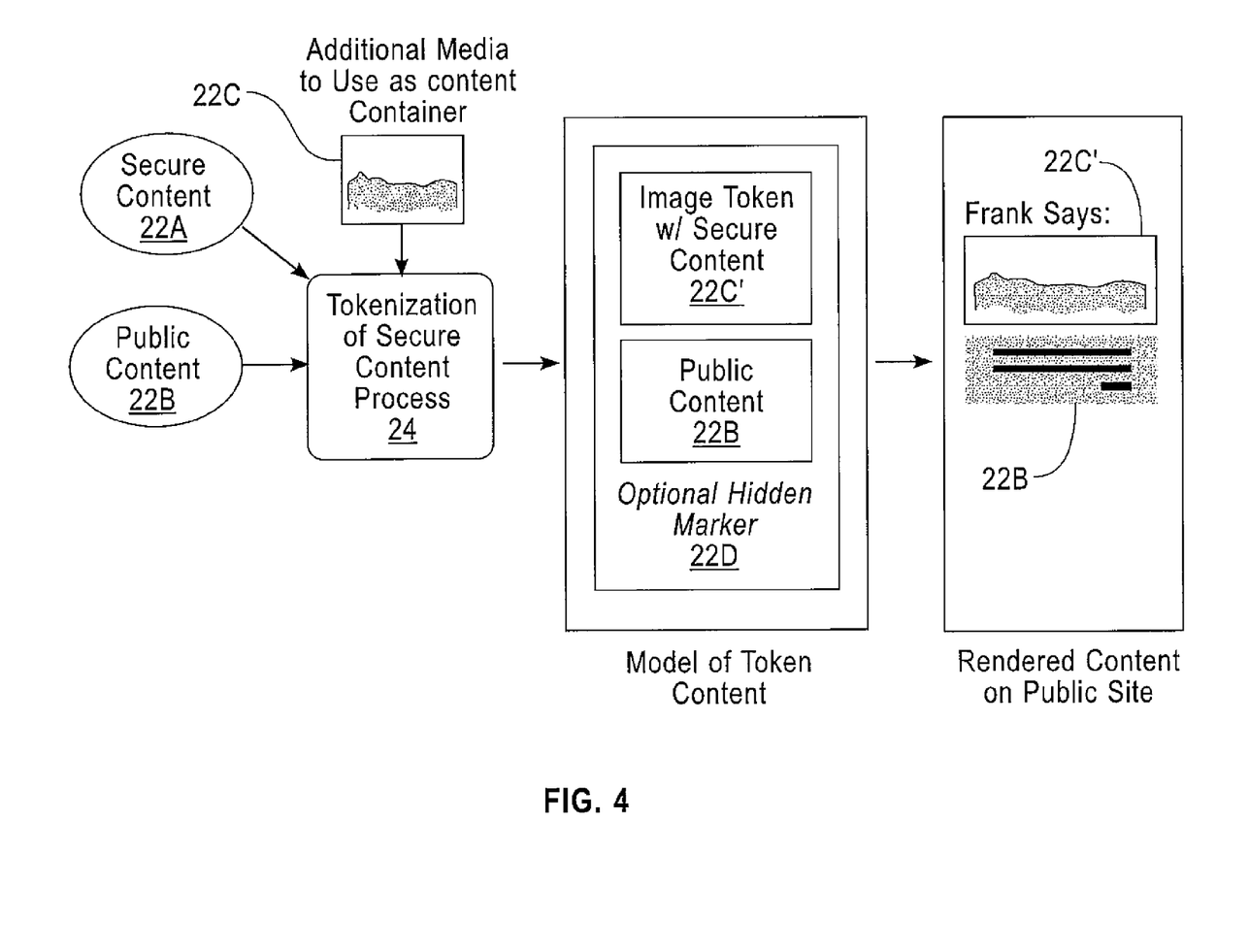
FIG. 4 provides an overview of an exemplary tokenization scheme for a social media service shown in FIG. 3.

FIG. 4 provides an overview of an exemplary tokenization scheme for the social media service 3" shown in FIG. 3. In FIG. 4 a user will post both secure content 22A and unsecure (public) content 22B to the social media service 3" via a tokenization of secure content process 24 that can form a part of the VPE gateway 14. The embodiments of this invention could also just post the secure content 22A, e.g., a status message, as encrypted text. However, the encrypted text would be visually perceptible to and could appear as garbled text to other users able to read the status. To avoid this type of undesirable user interface issue a more seamless experience for all users is achieved by allowing the content to be embedded in a more user-friendly container before being posted. In FIG. 4 the VPE gateway 14 tokenizes the secure content 22A by combining the secure content 22A and the public content 22B using a model based on the service driver 20 implementation. In the example shown in FIG. 4 the model used is a three-part token composed of the public content 22B posted with no transformations, an optional hidden tag or marker 22D such as a URL or other textual cue, and the secure content 22A camouflaged (obscured) in an image provided by additional media to use as a content container 22C. The camouflaging process can take several different forms, for example:

the secure content 22A is encrypted and embedded into the provided image using steganographic techniques to form a processed image 22C'; or the secure content 22A is stored locally on the VPE gateway 16 (e.g., in the memory 18) and only a token representing the content is embedded into the image 22C' using steganographic techniques.

In the first case the secure content 22A is stored on the servers of the social media site 3" but in an encrypted form. Using digital steganographic techniques it is possible to embed information into the 'noisy' bits of an image. The embodiments of this invention exploit this capability to use the image 22C' as a more user friendly container for the encrypted text, where the encrypted text is stored imperceptibly to the average user viewing the social media site in the 'noisy' bits of the image 22C'. The image 22C' can be any suitable image data, such as a logo of the enterprise. Note that in other embodiments the container could comprise, as non-limiting examples, audio data, video data, or a document or document image.

In the second case there may be a policy requirement to store all secure content 22A within the enterprise network 2A. In this case the invention uses some local storage system, such as the memory 18, to store the user's text (content) and creates a token that is a unique identifier (UUID) for that content. In accordance with this aspect of the invention the UUID is imperceptibly embedded into the image 22C' instead of the encrypted text. For example, the UUID could be a uniform resource locator (URL) representing a link back to the secure content that is only accessible to clients within the VPE network 2A.

FIG. 4 shows how an instance of the token model would appear when rendered on the social media site 3". To public users the post appears to be simply an image with some text associated with it. However, when accessed using the client 10 that is configured with the VPE monitor 12 the presence of the tokenized content is detected such as by the use of a tag or marker and the VPE monitor 12 operates to: 1) forward the token to the VPE gateway 14; 2) the VPE gateway 14 then processes the content to retrieve the secure content; and 3) the VPE gateway 14 sends the secure content 22A to the client 10. For example, when the VPE client 10 accesses the page in FIG. 4 the client 10 need not render the image 22C but rather just render the encrypted text that was steganographically embedded in the image 22C and then subsequently decrypted.

It can be noted that the use of tokenization with the data sharing service 3' may be based on similar properties and functions but can be inherently simpler. For example, the service driver 20 only has to encrypt the data before uploading to the document sharing service 3' and decrypt the document on behalf of the client 10 when it is read. Specific encryption techniques could also be employed to preserve properties of the underlying data. For example, for more seamless integration with the data sharing service 3' an encryption method that preserves the alphabetical ordering of document titles can be used so that the titles can be sorted in the same way as in the unencrypted documents.

It is pointed out that some or all of the functionality of the VPE manager 16 could be embodied in the service driver(s) 20.

The embodiments of this invention also allow for tokens to be partitioned across a set of users to ensure increased security by allowing data to be accessed only if all users of the set are able to access the token partitions, or only if some number of users that is less than the total number of users in the set are available. This can be useful in situations where collaborators need increased security and where tokens can be stored across different public services so that no one single service has access to the encrypted content. A cryptographic technique referred to as "secret sharing" can be used wherein algorithms partition secure content into several pieces. The content can only be successfully decrypted if the user has access to an appropriate number of partitions. The embodiments of this invention can exploit these techniques and can make the use of social networks in many public services.

One example of a well-known secret sharing scheme is Shamir's Algorithm. In this scheme a secret can be partitioned into k parts, whereby access to at least n parts makes computing the secret easy just from the content of those parts (i.e., no additional encryption keys are needed). For example, the parts could represent points in a parabolic equation that can be used to derive the secret through arithmetic methods. Access to less than n parts makes computing the secret difficult.

Figure 5:
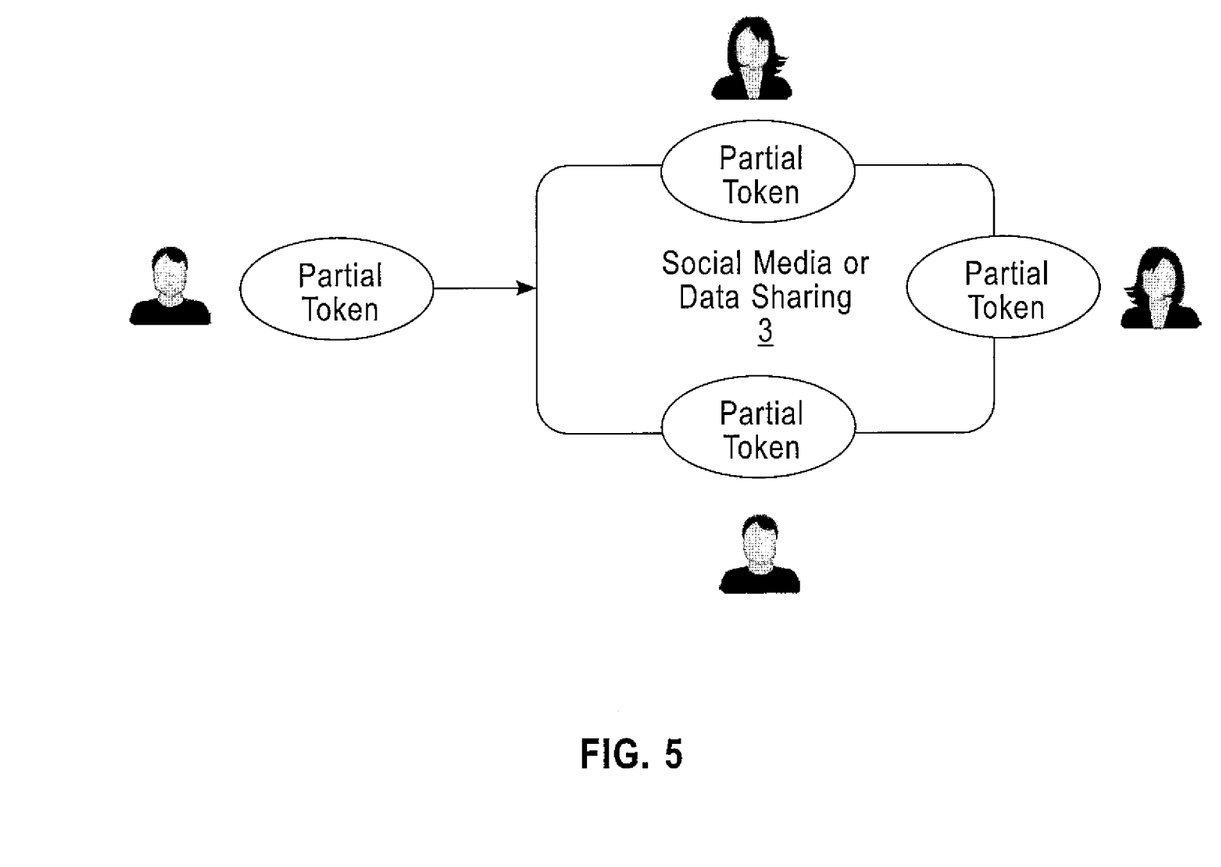
FIG. 5 depicts a situation where a group of collaborators securely share a document posted on a public service using the VPE system.

FIG. 5 depicts a situation where a group of collaborators securely share a document posted on a public service using VPE. In FIG. 5 the VPE manager 16 has partitioned a document into four parts and has sent one part to each user who needs access to the document. Users can receive their token from using the built-in messaging systems of the social media or data sharing site. For example, some social media sites provide a utility that allows users to send private messages to each other, or to post content that only a select group of people can see. Some data sharing sites allow users to share content with other users by generating a link to that content and sending the link via email.

Figure 6:
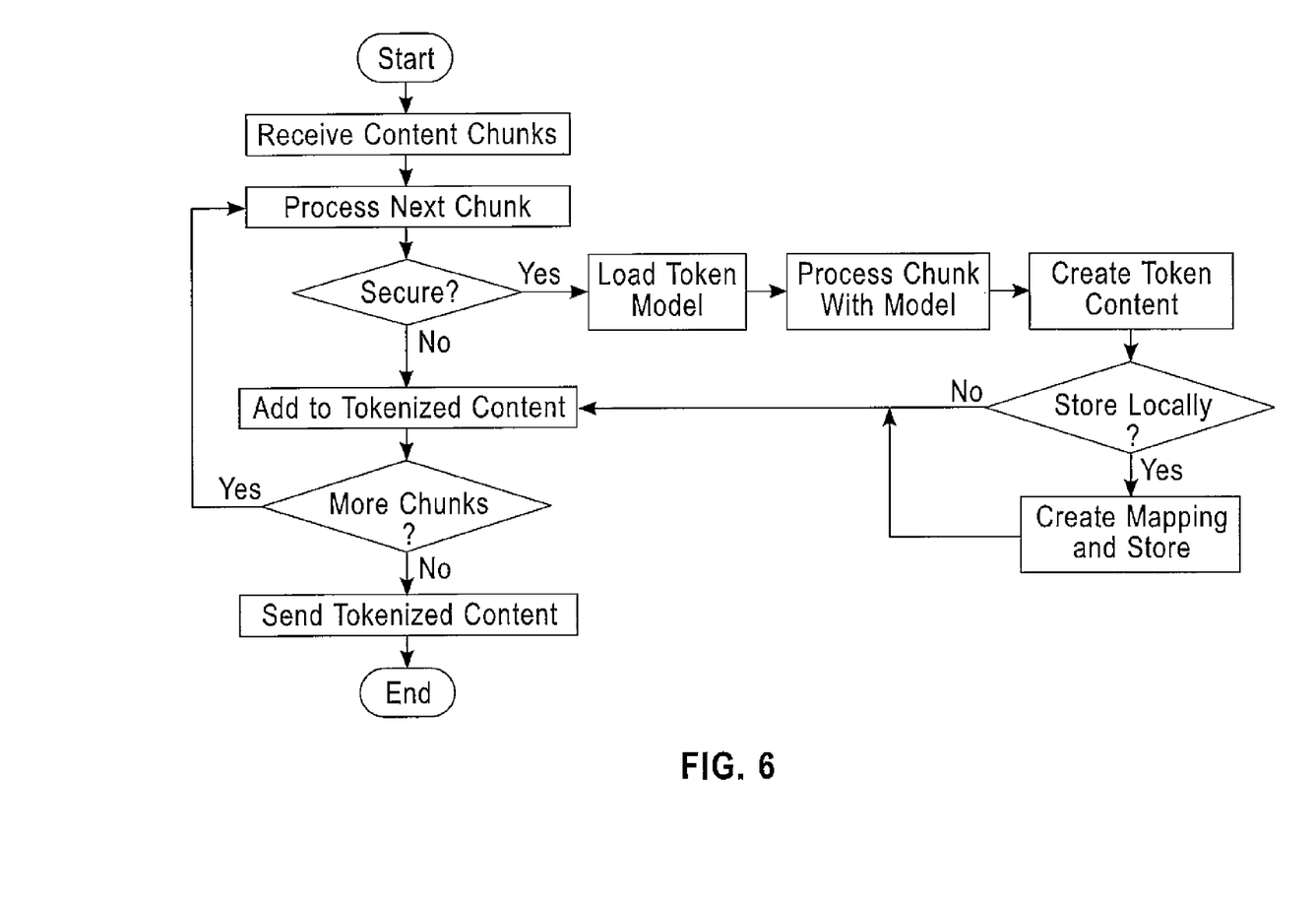
FIG. 6 depicts a logic flow diagram useful when explaining a method of this invention for tokenizing secure content by the VPE manager shown in FIG. 2.

FIG. 6 depicts a logic flow diagram useful when explaining a method of this invention for tokenizing secure content by the VPE manager 16. The logic flow diagram begins (start block) after the VPE monitor 12 has identified that content needs to be sent to a public service 3 that may need to be tokenized. The content is organized in this case as content 'chunks' or content 'portions' or content 'partitions' and the tokenization process considers each chunk independently. For example, the user may input data into a form presented in the user's browser. The monitor 12 sends each form entry as a chunk to be evaluated. It can be recalled that in the social media example provided above that the service driver 20 may have altered the VPE view of the social media service page to insert additional form elements for entering secure and non-secure content.

In FIG. 6 each chunk of received content is processed to determine if it is a secure chunk. If the chunk is not secure (e.g., is public) then the chunk is added to the public part of the outgoing token content. If the chunk is determined to be a secure chunk then the token model is loaded that is needed for the type of content in question. There is a token model for content type needed by a public service. For example, one social media site may have one token model for status updates, one for image uploads, and one for notes. The token model specifies how the chunk should be processed, which includes how if it should camouflaged by embedding the content in the container object such as the image container 22C. Once all processing is complete a final token object is created. If the final token object contains a link that references the secure content then the secure content is stored locally and indexed using the link. Otherwise the new token is added to the outgoing token content. The method iterates until all chunks are processed. The VPE manager 16 then sends the final token content to the public service 3.

Figure 7:
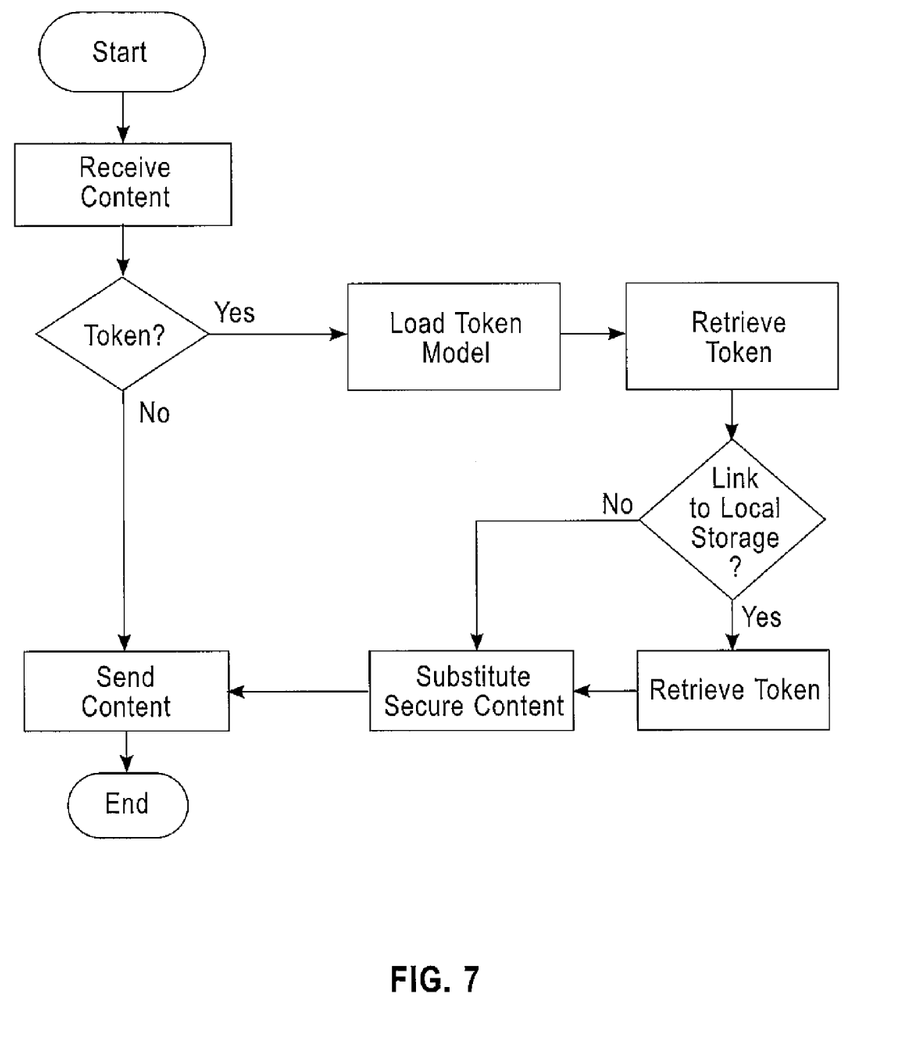
FIG. 7 depicts a logic flow diagram that is useful for explaining a method of this invention for recovering tokenized secure content at the VPE manager.

FIG. 7 depicts a logic flow diagram useful when explaining a method of this invention for recovering tokenized secure content at the VPE manager 16. The logic flow diagram begins when the client 10 is accessing content from a public service 3. The VPE monitor 12 detects this type of operation and scans the content to determine if it contains any token content (e.g., if there is some type of marker or flag or tag associated with the content). If token content is found then the appropriate token model is loaded and the system retrieves the token from the token content. The token can be either the encrypted secure content data itself, or a link to the content stored locally at the VPE manager 16. If the link is present the VPE manager 16 retrieves the associated content, otherwise it decrypts the content using appropriate methods and substitutes the secure content for the token content. In either case the content is sent to the client 10.

In an exemplary general sense the embodiments of this invention operate so as to enable secure data to be rendered in a visually imperceptible manner at a public service (for example, at a social media site or a data sharing site) so as to enable access to the secure data by a select group of users of the public service, such as only by members of some enterprise or by some subset of members of the enterprise. This operation can entail using, at one or more real and/or virtual data processors associated with the enterprise, a steganographic technique to embed the secure data in some type of information container, e.g., in an information container comprising one or more of image data, video data, audio data, document data, etc., that is perceptible to a human observer at the public service and/or by using some type of tokenization whereby, for example, a link to the secure data is imperceptibly embedded in some screen image rendered at the public service, such as by steganographically encoding the link into the screen image. Encryption of the secure data and/or the link may or may not be used. The "obscured" secure data can be selectively rendered/presented in a non-intrusive manner at the public service in conjunction with public, non-secure data thereby providing an enhanced visual experience for users of the public service. A "secret sharing" technique can also be employed in conjunction with or in combination with the foregoing techniques to enable the distribution of secure data to a group of relevant users.

Figure 8:
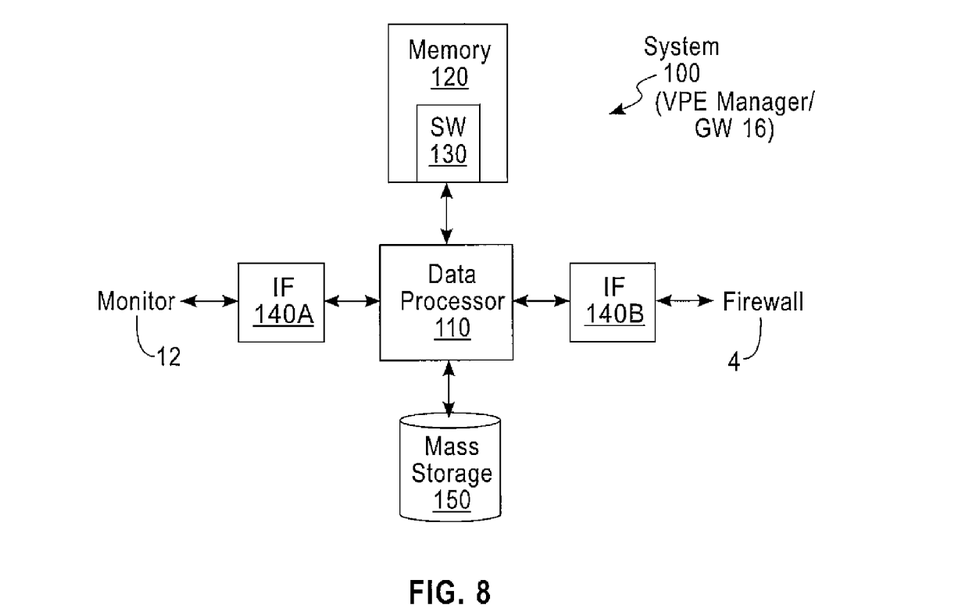
FIG. 8 illustrates a block diagram of one suitable embodiment of the VPE gateway/VPE manager of FIG. 2 when embodied as a data processing system that is capable of implementing the embodiments of this invention.

FIG. 8 shows a block diagram of one suitable embodiment of the VPE gateway/VPE manager 16 when embodied as a data processing system 100. The data processing system 100 is capable of implementing the embodiments of this invention. System 100 can be a standalone system that is resident at an enterprise or it can be a system that is instantiated as one or more virtual machines at a cloud platform provider/vendor/source. The system 100 includes at least one data processor (DP) 110 containing at least one CPU that is connected with at least one memory 120 such as one or more of semiconductor-based memory and disk-based memory that store computer program code or software (SW) 130. The SW 130, when executed by the at least one data processor 110, results in performance of operations that implement the methods of this invention. The SW 130 can include one or more instances of data encryption/decryption programs. The SW 130 can also include one or more instances of programs configured to steganographically embed data into a container, such as image data, and to also retrieve steganographically-embedded data from a container. Also connected to the data processor 110 is an interface (IF) 140A to the monitor 12 at the client 10, and another interface 140B for connection to the data communications network 3A (e.g., to the Internet) possibly via the enterprise firewall 4. The interfaces 140A, 140B can be a network interface such as one or both of a local area network (LAN), including a wireless LAN (WLAN), or a wide area network (WAN), including the Internet. Also connected with the data processor 110 can be at least one mass storage device 150 that stores content that is cached when the data processor 110 constructs and sends a token representing the content.

It should be noted that the data processing system 100, whether embodied as discrete hardware or embodied as cloud platform hardware and software (e.g., CPUs, storage devices, database managers, operating systems, etc.), could be physically present at one location at an enterprise of interest, or it could be physically present at and distributed over two or more locations. The actual implementation and location or locations of the instantiations of the system 100 and/or the cloud platform hardware and software that virtualizes the system 100 are not particularly germane to the description of the embodiments of this invention.

The monitor 12 and/or the service driver(s) 20 could be similarly constructed to include at least one CPU, memory, software and at least two interfaces, one being an interface to the client 10 and another being an interface to the VPE manager 16. Alternatively the monitor 12 could be implemented entirely as a software application that is resident on a computing platform of the client 10 and that communicates with the VPE manager 16 using any suitable data communications interface (e.g., LAN or WLAN) of the client 10.

Figure 9:
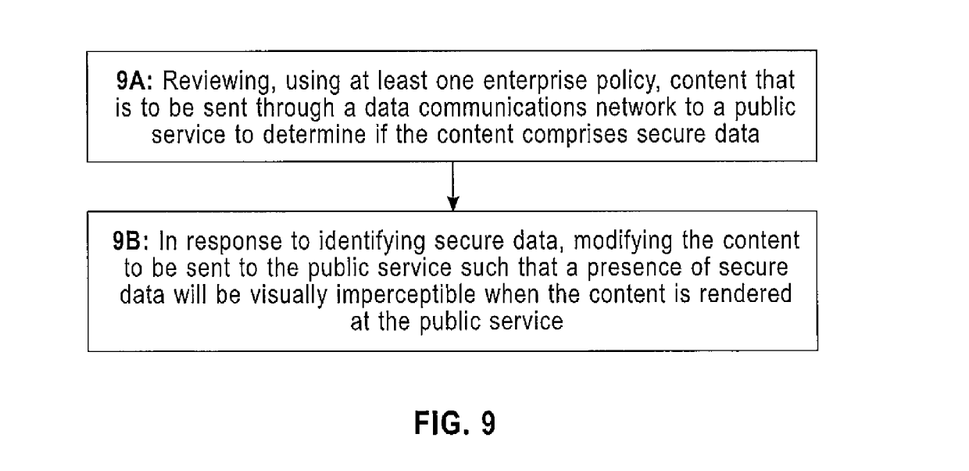
FIG. 9 illustrates one non-limiting example of a method in accordance with the various embodiments of this invention.

FIG. 9 illustrates one non-limiting example of a method in accordance with the various embodiments of this invention. The method that is shown in FIG. 9 is one to process content for an enterprise and comprises, at Block 9A, reviewing, using at least one enterprise policy, content that is to be sent through a data communications network to a public service to determine if the content comprises secure data. At Block 9B there is a step performed, in response to identifying secure data, of modifying the content to be sent to the public service such that a presence of secure data will be visually imperceptible when the content is rendered at the public service.

In the method depicted in FIG. 9 the step of modifying can comprise steganographically embedding the secure data in a container, such as in a container comprised of image data. The secure data can be encrypted prior to being steganographically embedded in the container.

In the method depicted in FIG. 9 the step of modifying can comprise storing the secure data in a storage medium that is accessible only within the enterprise, and steganographically embedding a link to the stored secure data in a container, such as in a container comprised of image data.

In the method depicted in FIG. 9 the content to be sent to the public service can comprise public data and the secure data or a link to the secure data.

In the method depicted in FIG. 9 the secure data can be partitioned such that a plurality of users each have access to one partition of the secure data.

In the method depicted in FIG. 9 the step of reviewing the content can comprise reviewing chunks of the content and for each chunk, determining if the chunk is comprised of public data or secure data, if the chunk is comprised of secure data modifying the chunk so as to be visually imperceptible when rendered at the public service, and when all chunks are reviewed sending the content comprised of chunks of public data and modified secure data to the public service.

In the method depicted in FIG. 9 and in the prior paragraph, the step of modifying the chunk can comprise steganographically embedding the chunk of secure data in a container sent with the public data, or storing the chunks of secure data in a storage medium that is accessible only within the enterprise and steganographically embedding a link to the stored chunks of secure data in the container.

A further aspect of this invention is a computer-readable storage medium that contains computer program instructions that when executed by at least one data processor result in performance of the method depicted in FIG. 9 and the foregoing several paragraphs that are descriptive of FIG. 9.

The embodiments of this invention enable an enterprise to use the public service 3, such as a file sharing site or a social media site, in a secure manner, and without imposing restrictions on communications. Instead the embodiments augment the communications to ensure that they follow at least one enterprise policy. The embodiments of this invention enable a seamless integration of secure content into the public service 3 where a token or encrypted data itself can be camouflaged or obscured so it appears to be 'normal' content in the public service 3.

The embodiments of this invention provide both token and non-token approaches to sending secure content to a public service and provide a more seamless integration of secure and non-secure content using camouflage data as a mask. The embodiments of this invention can utilize social groups to perform more secure "secret sharing" when secure content is stored in the public service 3. The use of the embodiments of this invention does not require access to any underlying virtual machine deployment.

The embodiments of this invention differ from conventional systems/methods that seek to simply secure network resources from unauthorized use, and focus on enhancing the communication between an authorized user and a public service by modifying how data is transmitted and stored during a user's interaction with the public service. Rather than restricting communications between a client and server, the embodiments of this invention augment the communication so that it can occur in a managed way and in accordance with any applicable (enterprise or other) policies that may be in effect. For example, data can be obfuscated and/or the system can dynamically alter user interaction modes with a public service so that only authorized users can read data written on a public service. The use of the embodiments of this invention augments consumer grade services for enterprise use, even if these consumer/public services do not provide native support for features required by enterprise policies. The embodiments are fundamentally agnostic to any underlying packet-level security mechanisms that may be in use.

One exemplary aspect of this invention provides a mechanism that allows the inclusion of clear text content in addition to encrypted content so that the contributed, secure content more seamlessly integrates with the un-secure (public) content. For example, encrypted content can be stored on a trusted server and only a link to that data is stored on an untrusted, publically available server. This link can be obfuscated by watermarking algorithms (e.g., stegano graphically obfuscated) which can subsequently be interpreted in order to link to and reveal the secure content. Also, if an application warrants storing encrypted information in the untrusted server the invention can apply 'secret sharing' logic to partition the encrypted content to users in the same social network. Access to that information requires being part of the group to decrypt the secure content from constituent partitions.

As opposed to some conventional schemes that attempt to restrict the ability of a person to post to social network or other public services though monitoring and filtering, the embodiments of this invention permit the person, as well as an entire organization, to use the public service for enterprise purposes.

The embodiments of this invention consider social networks and other public services as a commodity service that enterprises should be encouraged to exploit, and provide additional, non-native support for enforcement of enterprise policies.

An aspect of this invention is the provision of a seamless integration of an augmented communication into a public service, such as by integrating encrypted content in a non-obtrusive manner with public services data. Related to this is an ability to camouflage a token or even the encrypted data itself so it appears to be normal content in the public service. For example, an image token can be invisibly watermarked with a token. The embodiments of this invention are capable of recognizing the watermark and substituting the actual data for the token when it needs to be read by a user. Additionally, this invention allows the user to add unsecure content as part of the public posting, which in itself can act as a token for the secure content.

The embodiments of this invention provide in one aspect thereof a method for providing control of data on at least one consumer service (e.g., on a social network) by providing an enterprise interceptor function, possibly embodied in the VPE monitor 12 and/or in the VPE manager 16, for intercepting data/traffic destined for the consumer service 3 and for providing selective handling/filtering of data in accordance with at least one enterprise policy. The selective handling/filtering can comprise at least one of implementing an authentication/access policy for access to the data; encrypting the data; partially modifying the data content (e.g., by selective occlusion or selective encryption); adding hook points/tags for indexing and/or filtering; redirecting data and/or partitioning data. The enterprise interceptor provides selective handling of data by enforcing enterprise policies at a public consumer service such as a social network site.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a 'circuit', a 'module' or a 'system'. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a single local computer, partly on the local computer, as a stand-alone software package, partly on the local computer and partly on a remote computer or entirely on the remote computer or server. In the latter scenario, the remote computer may be connected to the local computer through any type of network, including a LAN or a WAN, or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A method to process content for an enterprise, comprising:
reviewing at an enterprise monitor, using at least one enterprise policy, content that is to be sent through a data communications network to a public service to determine if the content comprises secure data, where the content comprises unsecured, publically viewable content at the public service and the secure data that is not publically viewable content and that is viewable only by a client associated with the enterprise;
in response to identifying that the content comprises secure data, modifying the content by applying a transformation to the secure data and tokenizing the content to be sent to the public service such that as a result of the transformation a presence of the secure data will be visually imperceptible when the content is rendered at the public service; and
in response to the client associated with the enterprise accessing the public service to retrieve the content, identifying the presence of the tokenized content and reversing the transformation to make the secure data viewable at the client associated with the enterprise;
where modifying comprises steganographically embedding the secure data in a container, where the container is comprised of image data, and where the secure data is encrypted prior to being steganographically embedded in the container.

2. The method as in claim 1, where modifying comprises storing the secure data in a storage medium that is accessible only within the enterprise, and steganographically embedding a link to the stored secure data in a container.

3. The method as in claim 2, where the container is comprised of image data.

4. The method as in claim 1, where the content to be sent to the public service comprises public data and the secure data or a link to the secure data.

5. The method as in claim 1, where the secure data is partitioned such that a plurality of users each have access to one partition of the secure data.

6. The method as in claim 1, where reviewing the content comprises reviewing chunks of the content and for each chunk, determining if the chunk is comprised of public data or secure data, if the chunk is comprised of secure data modifying the chunk so as to be visually imperceptible when rendered at the public service, and when all chunks are reviewed sending the content comprised of chunks of public data and modified secure data to the public service.

7. The method as in claim 6, where modifying the chunk comprises steganographically embedding the chunk of secure data in a container sent with the public data, or storing the chunks of secure data in a storage medium that is accessible only within the enterprise and steganographically embedding a link to the stored chunks of secure data in the container.

8. A non-transitory computer-readable storage medium containing computer program instructions that when executed by at least one data processor result in performance of the method of claim 1.

9. A method to process content for an enterprise, comprising:
reviewing at an enterprise monitor, using at least one enterprise policy, content that is to be sent through a data communications network to a public service to determine if the content comprises secure data, where the content comprises unsecured, publically viewable content at the public service and the secure data that is not publically viewable content and that is viewable only by a client associated with the enterprise;
in response to identifying that the content comprises secure data, modifying the content by applying a transformation to the secure data and tokenizing the content to be sent to the public service such that as a result of the transformation a presence of the secure data will be visually imperceptible when the content is rendered at the public service; and
in response to the client associated with the enterprise accessing the public service to retrieve the content, identifying the presence of the tokenized content and reversing the transformation to make the secure data viewable at the client associated with the enterprise;
where reviewing the content comprises reviewing chunks of the content and for each chunk, determining if the chunk is comprised of public data or secure data,
if the chunk is determined to be comprised of secure data, applying the transformation to the chunk so as to be visually imperceptible when rendered at the public service, and
sending the content comprised of chunks of public data and transformed secure data to the public service;
where modifying comprises steganographically embedding the secure data in a container, where the container is comprised of image data, and where the secure data is encrypted prior to being steganographically embedded in the container.

10. The method as in claim 9, where applying the transformation to the chunk comprises steganographically embedding the chunk of secure data in a container sent with the public data.

11. The method as in claim 10, where the container is comprised of image data.

12. The method as in claim 10, where applying the transformation to the chunk comprises storing the chunks of secure data in a computer-readable digital data storage medium that is accessible only within the enterprise, and steganographically embedding in the container a link to the chunks of secure data that are stored in the computer-readable digital data storage medium.

13. The method as in claim 12, where the link is embodied as a uniform resource locator (URL), where the URL is steganographically embedded in the container.

14. A method to process content for a virtual private enterprise (VPE), comprising:
reviewing at a VPE monitor, using at least one VPE policy, content that is to be sent through a data communications network to a public service to determine if the content comprises secure content, where the content comprises unsecured, publically viewable content at the public service and the secure content that is not publically viewable content and that is viewable only by a client associated with the VPE;
in response to identifying secure content in some particular portion of the content, storing the portion of the content that corresponds to the secure content in a computer-readable digital data storage medium that is accessible only within the VPE;
steganographically embedding in a container a link back to the portion of the secure content that is stored in the computer-readable digital data storage medium, where a presence of the link within the container becomes substantially imperceptible when the content is rendered at the public service;
sending from the VPE to the public service the content including the unsecured content and the container having the steganographically embedded link;
in response to the client associated with the VPE accessing the public service to retrieve the content, identifying the presence of the link in the container;
extracting the steganographically embedded link; and
using the link to access the portion of the content that corresponds to the secure content from the computer-readable digital data storage medium that is accessible only within the VPE;
where the container is comprised of image data, and where the link is encrypted prior to being steganographically embedded in the container.

15. The method as in claim 14, where the link is embodied as a uniform resource locator (URL), where the URL is steganographically embedded in the container.

* * * * *